SELECTIVE RADIO REMOTE CONTROL SYSTEM RESPONSIVE TO THE RECEPTION OF A PREDETERMINED CARRIER FREQUENCY, MODULATING FREQUENCY AND QUENCH FREQUENCY FOR A PREDETERMINED MINIMUM DURATION

Filed April 22, 1964 2 Sheets-Sheet 1

INVENTOR
RICHARD GOLDSTEIN
by: Wallenstein, Spangenberg & Hattis
ATTYS.

Jan. 30, 1968 R. GOLDSTEIN 3,366,961

SELECTIVE RADIO REMOTE CONTROL SYSTEM RESPONSIVE TO THE RECEPTION OF A PREDETERMINED CARRIER FREQUENCY, MODULATING FREQUENCY AND QUENCH FREQUENCY FOR A PREDETERMINED MINIMUM DURATION

Filed April 22, 1964 2 Sheets-Sheet 2

INVENTOR
RICHARD GOLDSTEIN
by: Wallenstein, Spangenberg & Hattis
ATTYS.

3,366,961
SELECTIVE RADIO REMOTE CONTROL SYSTEM RESPONSIVE TO THE RECEPTION OF A PREDETERMINED CARRIER FREQUENCY, MODULATING FREQUENCY AND QUENCH FREQUENCY FOR A PREDETERMINED MINIMUM DURATION

Richard Goldstein, Mount Prospect, Ill., assignor to Perma-Power Company, Chicago, Ill., a corporation of Illinois Filed Apr. 22, 1964, Ser. No. 361,741
2 Claims. (Cl. 343—225)

The present invention relates to remote control systems useful for a variety of applications, such as the remote control of lights, motors and the like. However, the most important application of the present invention is the radio signal control of residential garage doors where the problems of a crowded frequency band and interfering signals from heterodyning signals and other causes (such as improper equipment operation in adjacent bands) pose particularly severe problems considering the cost limitations in the equipment involved.

There has been widespread interest and activity in the remote control field since the opening by the Federal Communications Commission of the Citizens Radio Service. One of the most useful areas of operation in this service is the 27 megacycle (MC) Class C bands which have been designated by the Federal Communications Commission for the remote control of objects and devices. Also permitted in these bands are low-power restricted radiation transmitters which require no license for operation.

The technical requirements for the receivers used in these remote control applications are severe, particularly with respect to the high degree of selectivity necessary for rejection of unwanted signals. Because the Class C frequency bands are sandwiched between the widely used Class D bands with only a 10 kilocycle bandwidth being involved for each class of service, a high degree of frequency selectivity is necessary to prevent unwanted interference. The Class D bands have created considerable difficulty in the Class C bands because of a widespread and continuous violation by the users of the Class D bands of the rules and regulations specified by the Federal Communications Commission. The interference problem is particularly acute in the case of control systems using low-powered transmitters, as in the case of garage door transmitters, which compete with much higher power radio transmitters employing highly efficient antenna systems. Contributing to the severity of the interference problem is the frequent off-frequency operation of Class D band equipment unnecessary crowding of the Class C bands by station operators fighting among each other to use the bands at the same time resulting in sustained carrier heterdyning producing interfering beats, equipment operation at transmitter power greater than permitted by the regulations and severe over-modulation causing excessive band width emissions extending into signal channels occupied by authorized garage door remote control transmitters.

In remote radio controlled garage door transmitting and receiving systems, the transmitters mounted in the motor vehicles are operated by momentary depression of a switch which energizes the transmitter circuit to generate a momentary control signal received by the receiver controlling a motor which operates the garage door. Once the garage door motor is initially energized, a holding circuit come into play which continues the operation of the garage door motor until the door-opening operation is completed. The transmitted signal is commonly an amplitude modulated signal having a carrier frequency falling within the Class C bands referred to. Such a signal is commonly obtained by combining the output of a radio frequency carrier oscillator and a relatively low frequency modulating oscillator in a suitable modulator circuit. An amplitude modulated signal is desirable because of the simplicity and low cost of the equipment necessary to generate such a signal, a highly important factor in the competitive garage door control field.

The carrier frequency utilized for garage door control equipment is limited to one of six Class C bands. A dealer will usually select one band and vary modulation frequency among his customers in a given area to avoid interference between neighboring garage door operating systems. The receivers are, therefore, provided with frequency selective decoding circuits which respond only to the modulation frequency assigned to the particular customer. The modulation frequencies commonly vary between very low audio frequencies to ultrasonic frequencies, that is, from several cycles per second to about 100 kilocycles per second. The most popular garage door transmitting and receiving systems operated with modulating frequencies in the audio frequency range of from 400 to 15,000 cycles per second. There are a number of advantages to using such frequencies, among them being the fact that a lesser band width is required than for ultrasonic modulating frequencies. Also, the use of audio frequency modulating frequencies results in less expensive and critical equipment than is required, for example, for mechanically resonant devices used at low audio or sub-audio frequencies.

The disadvantage of tone amplitude modulated systems in remote control applications is the lack of immunity to false responses from interfering signals. As previously indicated, because of the great demands upon the radio frequency spectrum, no protected frequencies are available for the sole operation of these devices and the frequencies are shared with other equipment, such as voice communication, scientific, medical and industrial apparatus. The presence of two or more interfering signals may produce in the receiver beats which have characteristics closely approximating the desired modulating tone frequency, resulting in unwanted operation of the garage door control equipment involved.

A solution to the difficulty just outlined is to be found in systems employing highly complex modulating schemes, such as simultaneous multiple modulating tone frequencies for various complex coding schemes. The complexity and cost of such systems generally preclude or severely limit their use in remote controls for the purposes described above where simplicity and low cost are paramount factors.

One of the objects of the present invention is to provide a remote control transmitting and receiving system which, in a very simple and inexpensive way, minimizes the possibility of trouble from interfering frequencies which may cause false or improper operation of the receiver equipment. A related object of the present invention is to provide a remote control transmitting and receiving equipment as described which operates with amplitude modulated signals.

Another object of the present invention is to provide improved receiver circuits for remote control systems and decoding circuits therefor wherein greater unwanted signal rejection is obtained without any significant increase in the cost of the equipment involved. A related object of the invention is to provide improved decoding circuits for receivers for remote control systems which operate more reliably and at lower cost than other similar equipment heretofore developed.

Still another object of the present invention is to provide an improved remote control transmitting and receiving system as above described having particular utility in remote radio controlled garage door installations.

In accordance with one aspect of the present invention, the transmitter of a remote control transmitting and receiving system of the type utilizing an amplitude modulated carrier is provided with means for periodically interrupting the transmission of the modulation of the modulated carrier (by interrupting the modulation or the carrier) at a rate substantially lower than the modulating frequency of the carrier. The receiver used in the system is provided with a modified decoding circuit which not only selectively responds to a modulated carrier having a particular modulating frequency, but also selectively responds to a demodulated signal of the desired frequency which is periodically interrupted at a rate much lower in frequency than the demodulated signal. Thus, continuous interfering signals at the desired modulating frequency for which the receiver is designed, appearing in the audio amplifier stages of the receiver will not effect operation of the particular control function to be carried out as referred to. The presence of unwanted signals lasting for only a few cycles or less of the interruption frequency are rendered ineffective by providing the receiver with time delay means which render the signal responsive control unit (or the circuit controlling the same) nonresponsive to signals which do not continue for a number of cycles (like four or more) of the interruption frequency. Tone bursts preferably occur at a rate of from about 5 pulses per second to about 40 pulses per second. Thus, a pick-up of 60 cycles per second commercial power line signals will not cause operation of the receiver. Furthermore, each burst preferably has a duty cycle (ratio of tone on to tone off) from about 20% to about 80%. Thus, an interfering tone signal produced by the beat of two carriers and broken up at a pulse repetition frequency between about 5 and 40 per second by ignition noise or similar interference cannot cause operation of the receiver because the duration thereof typical of such impulse noise sources is too short to appear as an interrupted tone with a duty cycle between about 20 to 80%.

Another important advantage of the use of a periodically interrupted amplitude modulated carrier is that the waveform involved can be obtained in an extremely simple and inexpensive manner, so that the cost of the transmitter need not be increased. For example, by the increase of a resistor value and the connection of a capacitor across the resistor in the radio frequency carrier oscillator or the modulating oscillator of the transmitter, a self-quenching oscillator circuit is produced which interrupts itself at the relatively low rate referred to. In either case, namely in the case where the radio frequency carrier oscillator or the modulating oscillator is periodically interrupted, a periodically interrupted amplitude modulated carrier is obtained (although the resultant radio signal waveforms are somewhat different in appearance) which modulated carrier produces the same waveform after demodulation and suitable signal processing in the receiver.

Another feature of the invention relates to an improvement in receiver decoding circuit which selectively responds to a demodulated signal of a particular frequency. This feature of the invention involves an improvement over the type of circuit disclosed in U.S. Patent No. 3,869,123, granted Jan. 13, 1959, wherein the demodulating circuit operates on the principle of directing the demodulated signal into two channels, one of which is a non-frequency selective channel and the other of which is a frequency selective channel including a band pass filter which rejects the desired frequency. The two channels are provided with rectifiers and filters which convert the alternating signal to a filtered direct current voltage. The resulting rectified and filtered voltages are connected in opposition and the resultant voltage fed to a D.C. control amplifier. Thus, no net control voltage results when signals are presently removed from the vicinity of the desired frequency and a control voltage results which can effect operation of a relay through the D.C. amplifier when a signal is present of or in the immediate vicinity of the desired frequency. The circuit disclosed in the above identified patent utilizes a transformer for isolating the input to the two channels from ground which is required by the subtraction circuit described.

In the improved decoding circuit forming another aspect of the invention, the frequency selectivity of the circuit is greatly improved and at reduced cost by eliminating the need for the transformer and the filter elements ahead of the amplifier. To this end, the non-frequency selective channel is connected to the input of a gated amplifier and the frequency selective channel is connected to a control stage which, in the most preferred form of the invention, is a control transistor which, upon the presence of a control signal, renders the gated amplifier inoperative, and, during the absence of a control signal, allows the gated amplifier to amplify the desired signal. The signal passed through the gated amplifier is used to effect a control operation. Thus, an on-off, rather than a progressive subtractive effect, is produced by utilizing the output of the frequency selective band pass channel to control the operation of a gated amplifier to produce a much greater frequency selectivity and at lower cost. In the preferred form of the invention, the decoding circuit also has the advantage of differential action, that is there is minimal change in its response characteristic with input level, because the level goes up and down simultaneously in both the amplifier and gate control input.

In accordance with the broader aspects of the invention, other arrangements of the channels are contemplated. For example, although a much inferior selectivity results, the channel leading to the input of the gated amplifier may include a band pass filter and the channel leading to the gate control amplifier can be a non-frequency selective channel and the presence of a desired signal in the frequency selective band pass channel can overcome the gate closing signal at the output of the other channel.

Other objects, advantages and features of the invention will become apparent upon making reference to the specifications to follow, the claims and the drawings wherein:

Figure 1:
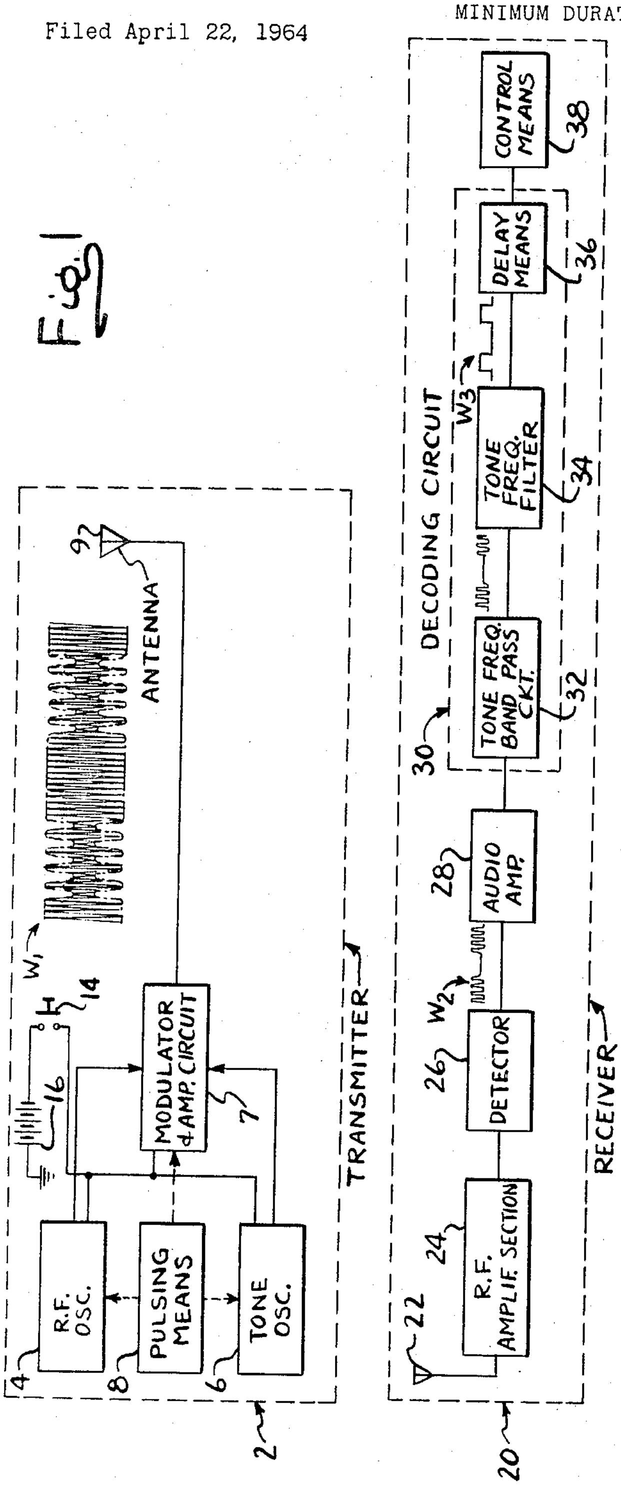
FIG. 1 is a block diagram of a remote control transmitting and receiving system including features of the present invention.

Referring now to FIG. 1, the transmitter there shown is generally indicated by reference numeral 2 and includes a radio frequency oscillator 4 which operates, in the case of garage door controls, in a Class D band, for example, 27.045 megacycles. The transmitter also includes a modulating or tone oscillator 6 which operates at a relatively low frequency such as the frequency in the middle or high audio frequency range and a modulator and amplifier circuit 7 which receives the output of the oscillators 4 and 6 and produces in any well known way an amplitude modulated signal which is radiated by an antenna 9. Means 8 is provided for periodically interrupting the amplitude modulated wave at a substantially lower rate than the frequency of the modulating or tone oscillator 6 with the exemplary frequencies referred to, the interruption rate would be at a low or sub-audio frequency. This may produce an amplitude modulated waveform $W_1$ illustrated in FIG. 1, where the radio frequency carrier is a continuous signal and the carrier is periodically amplitude modulated at the frequency of the oscillator 6, as illustrated, or a waveform (not shown) where the transmitted carrier signal is periodically interrupted (which also terminates any effective radiation by the antenna of the modulating frequency present in the modulator and amplifier circuit). In such case, during the interval when the carrier signal is being transmitter it will be amplitude modulated.

In accordance with one specific aspect of the invention, the waveform $W_1$ illustrated in FIG. 1 is simply obtained by periodically interrupting the modulating oscillator 6 and the other waveform referred to is simply obtained by periodically interrupting the radio frequency oscillator 4. The interruption of the oscillators 4 or 6 is achieved in an exceedingly simple and inexpensive manner, namely by the addition or modification of only two elements in the oscillator circuit to be described hereinafter. Thus, for example, by adding a capacitor and modifying the value of a resistor in the oscillator 4 or 6, the oscillator can be convertd to a self-quenching oscillator which automatically and periodically interrupts itself while the transmitter circuit remains energized.

In remote control garage door systems and the like, a manually operable pushbutton switch 14 is usually provided for momentary operation by the operator. Operation of the switch connects a source of direct current energizing voltage 16 to the various circuits of the transmitter. In the self-quenching oscillator circuit referred to above, the oscillator remains energized from the source of direct current voltage 16 during depression of the switch but, due to the circuitry thereof, it will periodically interrupt itself at the desired interruption rate. The frequencies involved are such that for the momentary (few seconds) operation of the switch 14, an appreciable number of bursts of the modulated carrier take place. In the exemplary circuit being described, at least four such bursts or interruptions must take place to effect the control function involved.

Self-quenching oscillators are not new and are classically produced by the addition of a single capacitor to the circuit. However, it is believed new to use a quenching oscillator in a transmitter for providing additional coding of a signal. One significant thing about the oscillator is that it is preferably a transistor circuit which produces a self-quench (or self-interrupted) output with an extremely useful range of interruption frequencies (1 to several hundred p.p.s.), such interruption frequencies being associated with useful and chooseable duty cycles, e.g., about 20 to 60%. The waveform of the burst envelope is also good since the rise time of the burst envelope is short and the decrease in amplitude during the burst period is as little as 20%. Thus a good approximation to a rectangular tone burst is created.

A similar result for these burst repetition frequencies and duty cycles is not readily (if at all) obtainable with vacuum tubes. The attainment of full burst amplitude within a cycle or two of the tone is not achieved with vacuum tubes. Typical burst waveforms for quenched oscillators used in super-regenerative detectors, for instance, show an exponentially increasing amplitude extending over about one-half of the burst duration.

The reason these results are possible with transistors is that the cut-off phenomena in a transistor is much sharper than a vacuum tube, that is, the variation in base emitter voltage between saturation and cut-off is a much smaller ratio to the signal voltages the device is capable of generating than the corresponding ratio in vacuum tubes.

The receiver in FIG. 1 generally indicated by reference numeral 20 includes a suitable receiving antenna 22 which is connected to the input of a radio frequency amplification section 4 which is tuned to receive only the particular carrier frequency transmitted by the transmitter 2. This section may be a superheterodyne receiver section including both radio frequency and intermediate frequency amplifiers, or it can be a straight radio frequency amplifier section without any frequency conversion stages.

The output of the radio frequency amplifier section 24 is connected to a conventional detector 26 which demodulates the received signal to provide a waveform constituting the envelope of the modulation of the carrier. In both type of waveforms referred to above, the demodulated signal will comprise a waveform $W_2$ consisting of a periodically interrupted waveform at the frequency of the modulating oscillator 6. The detected waveform may be fed to a suitable audio amplifier 28 and then to a decoding circuit generally indicated by reference numeral 30 which constitutes a specific aspect of the present invention.

The decoding circuit 30, to be described, is a circuit which selectively responds only to a periodically interrupted signal at the modulating frequency. Thus, if a continuous waveform appears in the decoding circuit 30 at the modulating frequency, the decoding circuit will produce no output for this signal. In this way, the response of the receiver to unwanted signals is minimized. The decoding circuit 30 includes a tone frequency recognition circuit 32 which filters out substantially all frequencies but the modulating frequency. One aspect of the invention relates to the features of the circuit 32 shown in the detailed block diagram of FIG. 2 to be described later on in the specification. The acceptance band of the tone recognition circuit 32 is most advantageously such that the tone is within approximately $\pm 5\%$ of the specified tone frequency. By using the characteristics of a low Q inductor arranged in a rejection filter as described, a discrete "yes-no" bandwidth is obtained that compares with that obtainable normally only through the use of multi-element band pass filters.

The output of the tone frequency recognition circuit 32 is fed to a tone frequency filter network 34 which filters out the tone frequency and passes only frequencies substantially lower than that of the tone frequency, so as to include the interruption rate frequency so that the output of the filter network 34 corresponds to the envelope $W_3$ of the demodulated waveform $W_2$ fed to the input thereof. Thus, any continuous interfering or spurious signals appearing in the input to the decoding circuit which will pass through the tone frequency pass band circuit 32 will not pass through the tone frequency filter network 34.

The filter constants are preferably so chosen as to require a tone burst rate between 5 and 40 pulses per second and a duty cycle between 20% and 80%. This places a rather severe requirement upon the character of the signal to which the system will respond.

The output of the tone frequency filter network 34 is fed either directly or indirectly to a delay means 36. Delay means 36 may be a capacitor shunting the coil for a control relay or the like, identified by reference number 38 in FIG. 1. The capacitor is made of such a value that the time constant of the circuit of which it forms a part is so long that the waveform $W_3$ will not affect the relay until a number of bursts thereof above a given repetitive rate have occurred. The delay means 36 thus adds an additional safety factor should a signal lasting a few cycles pass through the tone frequency filter 34.

Figure 2:
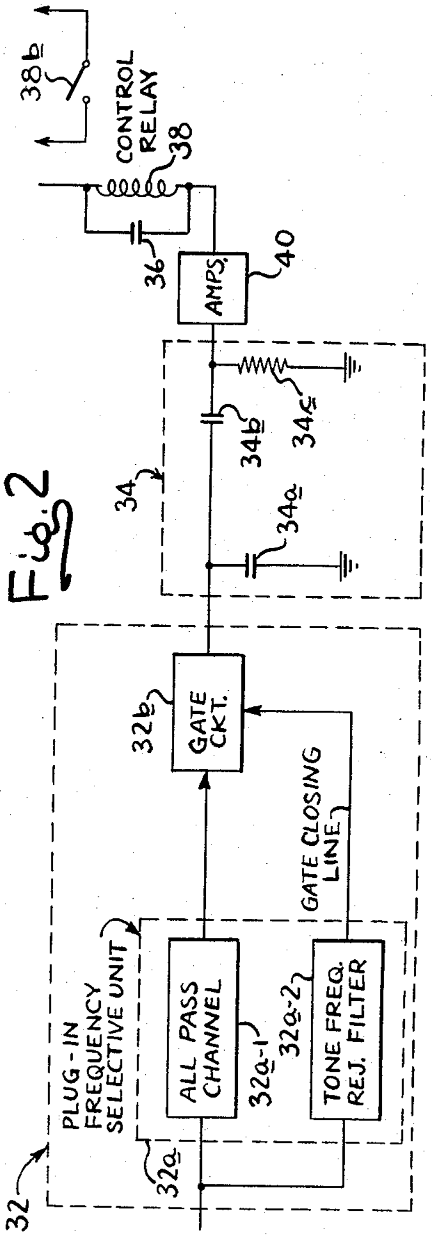
FIG. 2 is a detailed block diagram of a portion of the receiver shown in FIG. 1.
Figures 3, 4:
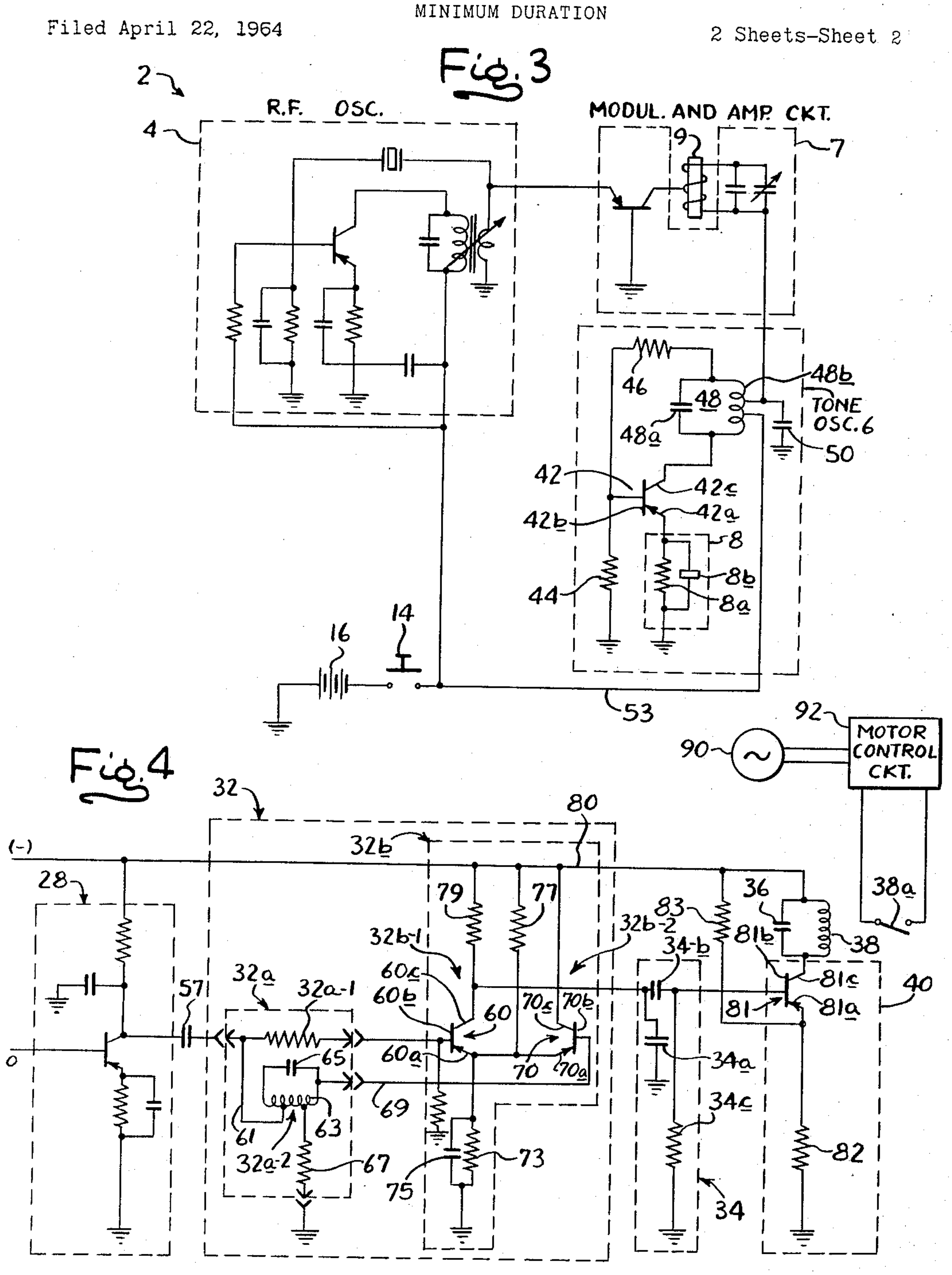
FIG. 3 is a circuit diagram of the transmitter shown in block form in FIG. 1.
FIG. 4 is a circuit diagram of that portion of the receiver circuit shown in block form in FIG. 2.

Referring now to FIG. 2 for a more detailed disclosure of the preferred decoding circuit 30. As there shown, the tone frequency recognition circuit 32 includes a plug-in unit which determines the tone frequency to be responded to by the receiver. In the case of remote control systems which may be located in the same area, each of the users in a given area would be given a different plug-in unit 32 designed to respond to or "recognize" a different tone oscillator frequency. Each plug-in unit as illustrated includes a non-frequency selective channel **32*a*–1 and a frequency selective channel 32*a*–2. The non-frequency responsive channel 32*a*–1 may, for example, consist simply of a resistor as shown in FIG. 3. The frequency selective channel 32*a*–2** most advantageously comprises a filter which rejects any signal having the desired modulating frequency and passes substantially all other frequencies present in the circuit input.

The output of the non-frequency selective channel **32*a*–1 is connected to an input of a gate circuit 32*b* which, as shown in FIG. 4, may include a gated amplifier stage 32*b*–1 which, when allowed to operate, will pass and amplify the signal fed to the input thereof, and a control stage 32*b*–2 which received its input from the output of the frequency selective channel 32*a*–2**.

When a signal of the desired frequency is fed to the input of the tone frequency recognition circuit 32, the frequency selective channel **32*a*–2 will remove the signal from the output thereof and the non-frequency selective channel 32*a*–1** will pass the signal to the input of the gate circuit which passes and amplifies the desired signal.

When a signal of other than the desired frequency is present at the input to the tone frequency recognition circuit 32, an output will appear at the tone frequency rejection filter **32*a*–2, which is fed to the control stage of the gate circuit effectively to close the gate circuit (i.e., in the exemplary circuit to render the gated amplifier 32*b*–1 inoperative), so the undesired signal fed to the input thereof will not reach or have an effect on the control means 38**.

The decoding circuits heretofore used in remote control of garage doors use plug-in units having similar frequency selective and non-frequency selective channels related in a different manner than just described. However, in these prior circuits, the A.C. signal outputs thereof are converted to direct current by rectifiers and connected in polarity opposition effectively to subtract the outputs thereof before being fed to subsequent amplifier stages. This type of circuit requires not only rectifiers and filter capacitors but also a transformer connection at the input of the plug-in unit to isolate the input from ground. A substantially improved frequency selectivity characteristic is achieved by the circuit 32 just described wherein the output of the non-frequency selective channel **32*a*–1 is fed to a gate and the output of the tone frequency rejection filter channel 32*a*–2** is utilized to control the operation of the gate to provide an on-off type of operation rather than a subtractive type of operation.

An output present in the output of the gate circuit is coupled to the aforementioned tone frequency filter network 34 which may include a shunt capacitor **34*a* connected between the output of the gate circuit and ground. The capacitor is of a sufficiently large value that it not only bypasses to ground frequencies in the neighborhood of the range of frequencies used for the tone oscillator frequencies (e.g., 400 to 15,000 cycles per second), but it preferably also provides with the resistance of the circuit feeding the same a sufficiently long time constant that rectangular waveforms (or sinusoidal waveforms) having a repetition rate or frequency of about 60 pulses or cycles per second or greater will not develop a sufficient voltage across the shunt capacitor 34*a* to operate the control means or relay 38. Input waveforms having a duty cycle (pulse width) of under, for example, about 20% are also preferably made ineffective by the capacitor 34*a* since signals of such short duration act like high frequency signals and will not develop a sufficiently large voltage across the slow responding shunt capacitor 34*a* to operate the control means. Input waveforms having duty cycles of above, for example, about 80% will also have little or no effect on the control means because such signals act like fixed (direct current) signals which momentarily return to zero for short durations and the slow responding capacitor 34*a* does not respond or follow the short quick changing returns of the signal to zero and thus develops a substantially constant or fixed voltage thereacross. This fixed voltage is blocked from the output of the filter network 34 by a series capacitor 34*b*. For a circuit having an input resistance of about from 4,000 to 10,000 ohms, the capacitor 34*a*** desirable has a value of between about .5 to 2 microfarads.

The series capacitor **34*b* is connected between the ungrounded end of the capacitor 34*a* and the end of a resistor 34*c* whose opposite end is grounded and across which the output of the filter network is taken. The capacitor 34*b* acts as a high attenuating series impedance to the principal lower pulse repetition rates or frequencies of below about 5 pulses or cycles per second. In other words the time constant of the capacitor 34*b* and resistor 34*c* is so small that low frequency rectangular pulses are differentiated and low frequency sinusoidal signals are substantially absorbed by the series capacitor leaving little or no average voltage developed across the resistor 34*c*. The capacitor 34*b*, for example, most desirably has a value of from 1 to 4 microfarads and the resistor 34*c*** most desirably has a value of from 2,000 to 7,000 ohms.

The capacitor **34*b* couples the envelope frequencies from 5 cycles per second and above to the resistor 34*c*. The output of the tone oscillator filter network 34 is fed to one or more amplifiers 40 whose output includes or controls the control relay 38 having the delay means which may be a capacitor 36 connected in parallel therewith or the input to amplifier 40. The delay means preferably requires several cycles of the desired modulation frequency in the range of from 5 to 40 cycles per second to operate the relay 38. The capacitor 36** may desirably have a value of from 50 to 100 microfarads in a circuit where the associated resistance is about from 100 to 700 ohms.

Now that the general features of the invention have been described, exemplary circuits illustrated in FIGS. 3 and 4 for parts of the transmitter and receiver will be described.

As shown in FIG. 3, the oscillator and modulator circuits 4, 6 and 7 of the transmitter 2 are transistorized circuits. Transistors have among other advantages, the advantage of low voltage and low power drain requirements and high reliability. In the case of remote control garage doors systems where the transmitter is mounted in a motor vehicle, transistors make possible compact dry battery operated transmitters which require little effort in installing the same in the vehicle. The radio frequency and oscillator circuits 4 and 6 are illustrated as more or less conventional type circuits with one exception, and that is the provision of the pulsing means 8 as an integral part of one of the oscillators. The pulsing means 8 illustrated comprises, in the illustrated example of the invention, a resistor **8*a* and a capacitor 8*b* connected in parallel between the emitter 42*a* of a PNP transistor 42 forming part of the modulating oscillator 6 and ground. The base electrode 42*b* of the transistor 42 is connected by a resistor 44 to ground. The base electrode 42 is also connected through a resistor 46 to the upper end of a tank circuit 48 comprising a capacitor 48*a* in parallel with an inductance 48*b* which constitute a parallel resonant circuit tuned to the desired modulating frequency. The end of the tank circuit remote from the end associated with the base electrode of the transistor 42 is connected to the collector electrode 42*c* of the transistor 42. A capacitor 50 is connected between a tap-off point on the inductance 48*b* to ground. The direct current supply 16 is connected through the pushbutton switch 14 and a conductor 53 to another tap-off point on the inductance 48*b***.

If the resistor **8*a* was of normal value, for example, a low value such as from 68 to 200 ohms, with or without the capacitor 8*b*, the circuit is assumed to be a continuously operating oscillator circuit continuously generating a sinusoidal waveform while the oscillator circuit remains energized. In the circuit illustrated, the advantageous periodically amplitude modulated carrier is achieved by the simple and inexpensive expedient of increasing the value of the resistor 8*a* to a value, for example, in the order of from 470 to 1,000 ohms which would reduce gain by degeneration to prevent continuous oscillation of the circuit, and adding capacitor 8*b*** having a very low capacitive reactance, such as one having a capacitance of from 39 to 68 microfarads depending upon the desired interruption rate.

The time constant of this capacitor and resistor circuit is selected so that the oscillator alternates between the oscillating and non-oscillating state at the desired interruption rate (e.g., 2–200 cycles per second). The capacitor 8b and the resistor 8a form with the rest of the circuit a self-quenching oscillator circuit which, for very little expense, provides the more complex modulated waveform required for the operation of the present invention as described above.

Quenching action takes place because the direct current operating point of the transistor changes with the level of oscillation. At the moment the supply voltage is connected the emitter voltage is zero. Oscillations start immediately and build to a limiting maximum amplitude in a matter of several cycles. However, the transistor is actually being driven by its own output and the input signal is rectified and amplified. As a result of this driving signal, the emitter voltage rises. During this rise time, the collector to emitter voltage drops slightly and the amplitude of oscillations is slightly decreased. At some point the emitter to base voltage has risen sufficiently to reduce the transistor gain below the point necessary to sustain oscillations which then abruptly cease.

As previously indicated, the modulator circuit 7 may be a conventional modulator circuit which combines the radio frequency signal of the oscillator 4 and the low frequency signal of the tone oscillator 6 to provide an amplitude modulated carrier in the conventional way (although the waveform produced is not conventional).

Refer now to FIG. 4 which illustrates exemplary circuitry for that portion of the receiver circuit beginning with the audio amplifier 28 in FIG. 1. As shown in FIG. 4, the audio amplifier 28 is a conventional PNP transistor amplifier circuit, the details of which need not be described. The output thereof is coupled through a capacitor 57 to the tone frequency band pass circuit 32. The aforementioned resistor 32a–1 constituting the non-frequency selective channel of the circuit 32 is connected between the output side of the capacitor 57 and the base electrode 60b of a PNP transistor 60 forming a part of the gated amplifier 32b–1. A conductor 61 extends from the side of the resistor 32a–1 nearest the capacitor 57 to a tap-off point on an inductance 63 forming part of a bridge-T filter network. A capacitor 65 is connected in parallel with the inductance 63 to form a parallel resonant circuit tuned to the desired modulating frequency, and a resistor 67 is connected between another tap-off point on the inductance 63 to ground. The output from the bridge-T network is taken at one end of the parallel resonant circuit by a conductor 69 connected to the base electrode 70b of a PNP transistor 70 forming part of the gate control circuit 32b–2.

As previously indicated, the particular bridge-T network illustrated is one wherein no signal appears on the output conductor 69 at the desired modulating frequency for the remote control system involved, and so a signal appears on the output conductor 69 if signals of other frequencies are fed to the circuit 32. An output signal appearing on the conductor 69 will effect current flow through the emitter-collector circuit of the control transistor 70. The transistor 70 is normally rendered non-conductive in the absence of such a signal by the connection of the emitter electrode 70a of the transistor 70 through a resistor 77 to a negative supply bus 80.

The emitter electrode 70a of the transistor 70 is connected to the emitter circuit of the gated amplifier transistor 60, to effect a control of the operation thereof in the manner to be explained. This emitter circuit includes a resistor 73 shunted by a capacitor 75 connected between the emitter electrode 60a of the transistor 60 and ground. The collector electrode 60c of the transistor 60 is connected through a resistor 79 to a negative supply bus 80 and the collector electrode 70c of the control transistor 70 is connected directly to the negative supply bus 80.

When a signal is present on the base electrode 70b of the gated amplifier transistor 70, the signal will be amplified by the gated amplifier unless a signal is also present on the base electrode 70b of the transistor which signal will overcome the effect of the back bias fed to the emitter electrode 70a through the resistor 77. In the latter event the resulting current flow will result in a larger voltage drop across the resistor 73 in the emitter circuit of the gated amplifier 32b–1 which will render the transistor 60 substantially non-conductive thus to decouple any signal on the base electrode of the transistor 60 from the output of the gated amplifier.

It is apparent that, normally when the desired tone oscillator signal is present, no signal will appear on the output conductor 69 so that the gated amplifier 32b–1 is fully operative to pass the desired tone oscillator signal to the tone frequency filter network 34 previously described.

The output of the filter network is coupled to a transistor amplifier 40 illustrated in FIG. 4 as a gated amplifier including a PNP transistor 81 whose base electrode 81b is connected to the output of the filter network 34. The emitter electrode 81a of the transistor 81 is connected through a resistor 82 to ground. In the absence of a signal on the base electrode 81b the transistor 81 is rendered non-conductive by a biasing branch including a resistor 83 connected between the negative bus 80 and the emitter electrode 81a. This bias is overcome upon the momentary presence during each negative going half cycle of the alternating current waveform appearing across the filter resistor 34c which has a duty cycle of 20% and above which renders the transistor 81 conductive. The collector electrode 81c of the transistor 81 is connected through the relay coil 38 to the negative bus 80. As previously indicated the capacitor 36 which operates as a delaying means as described is connected in parallel with the relay coil 38. The capacitor 36, for example, may have a value of 200 microfarads more or less, which gives the required delay of operation of the relay coil 38 when the transistor 81 begins to conduct in the manner explained above.

The relay has a set of normally open contacts 38a which control the connection of a source of alternating current (or other suitable supply) 91 to a motor control circuit generally indicated by reference numeral 92. In the case of a garage door control system, the motor control circuit would include a holding relay circuit (not shown) which effects the continued energization of a motor which raises the garage door until the door is fully opened, even though the relay contacts 38a reopen. It is common in present day garage door control systems to design the motor control circuit 92 to reverse the direction of garage door movement each time the relay coil 38 is energized.

It is apparent that the present invention has provided an exceedingly reliable remote control system having the various advantages referred to in the introductory part of the specification.

It should be understood that numerous modifications may be made in the preferred form of the invention described above without deviating from the broader aspects thereof.

I claim:

1. A garage door operating system comprising a vehicle mounted transmitter including means for generating and transmitting an amplitude modulated carrier signal, manually operable control means in the vehicle for selectively momentarily energizing said transmitter to produce said modulated carrier signal, and signal interrupting means for periodically interrupting the transmission of the modulated carrier while said transmitter remains energized, such interruption occurring at a rate substantially lower than the modulating frequency of said carrier signal and within a range having a maximum rate below the prevailing power line frequency and a minimum rate substantially above zero and providing a duty cycle in the amplitude modulated carrier signal falling within a range having a minimum duty cycle about 20% and a maximum duty cycle about 80%; and a receiver at the garage involved which receiver includes carrier signal amplifying, detecting, decoding and garage door control sections for amplifying the received amplitude modulated carrier signal, demodulating the carrier, selectively producing a control signal for a demodulated signal having said first given frequency and initiating a garage door moving operation in response to the presence of a control signal, said decoding section of said receiver including first filter means for passing substantially only a demodulated signal having the modulation frequency of the modulated carrier, second filter means coupled to the output of said first filter means for filtering out a signal of the frequency of said modulating oscillator and passing only signals which have an interruption rate or frequency falling within said range having a maximum rate below the prevailing power line frequency and a minimum rate substantially above zero and a duty cycle which falls within said range having a minimum duty cycle about 20% and a maximum duty cycle about 80% and said garage door control section of the receiver including means responsive to the signal passed by the second filter means for preventing operation of the control section unless the signal passed by said second filter means continues for a given period lasting for at least a given number of interruption periods of said modulated carrier.

2. The transmitter and receiver system of claim 1 wherein said transmitter includes carrier modulating means comprising a transistor oscillator circuit including a control transistor having base, emitter and collector electrodes, oscillator quenching impedance means on the emitter side of the emitter-collector current carrying circuit of said transistor, said base electrode of the transistor and the side of said impedance means remote from the emitter electrode of the transistor being coupled to a common point so said impedance means normally inhibits the oscillation thereof, and capacitor bypass means in parallel with said impedance means which initially acts like a transient short circuiting impedance to permit the oscillator to oscillate for a predetermined period until the charge on the capacitor reaches a given state of charge.

References Cited

UNITED STATES PATENTS

| | | | |
|---|---|---|---|
| 2,935,572 | 5/1960 | Hastings et al. | 340—171 |
| 2,991,357 | 4/1961 | True | 325—105 |
| 2,993,178 | 7/1961 | Burger | 331—174 |
| 3,031,603 | 4/1962 | Hills | 325—37 |
| 3,098,179 | 7/1963 | Van Rossum et al. | 340—171 |
| 3,187,234 | 6/1965 | Muranaka et al. | 340—171 |
| 3,128,349 | 4/1964 | Boesch et al. | 340—171 |
| 3,209,262 | 9/1965 | Reynolds | 325—139 |
| 3,281,790 | 10/1966 | Roscoe | 340—171 |

JOHN W. CALDWELL, *Primary Examiner.*

NEIL C. READ, *Examiner.*

A. J. KASPER, *Assistant Examiner.*